US012801908B2

(12) United States Patent
Tian et al.

(10) Patent No.: US 12,801,908 B2
(45) Date of Patent: Nov. 17, 2026

(54) NEURAL NETWORK PROCESSING UNIT, NEURAL NETWORK PROCESSING METHOD AND DEVICE FOR QUANTIZATION

(71) Applicant: BEIJING BAIDU NETCOM SCIENCE TECHNOLOGY CO., LTD., Beijing (CN)

(72) Inventors: Chao Tian, Beijing (CN); Lei Jia, Beijing (CN); Xiaoping Yan, Beijing (CN); Junhui Wen, Beijing (CN); Guanglai Deng, Beijing (CN); Qiang Li, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 1203 days.

(21) Appl. No.: 17/832,303

(22) Filed: Jun. 3, 2022

(65) Prior Publication Data

US 2022/0292337 A1 Sep. 15, 2022

(30) Foreign Application Priority Data

Jun. 18, 2021 (CN) ........................ 202110679295.X

(51) Int. Cl.
*G06F 9/30* (2018.01)
*G06F 9/50* (2006.01)
(Continued)

(52) U.S. Cl.
CPC ......... *G06N 3/065* (2023.01); *G06F 9/30036* (2013.01); *G06F 9/5016* (2013.01); *G06F 18/2148* (2023.01)

(58) Field of Classification Search
CPC ...... G06N 3/065; G06N 3/0464; G06N 3/045; G06N 3/0495; G06N 3/048; G06N 3/063;
(Continued)

(56) References Cited

U.S. PATENT DOCUMENTS

2019/0102671 A1 4/2019 Cohen et al.
2019/0114548 A1 4/2019 Wu et al.
(Continued)

FOREIGN PATENT DOCUMENTS

CN 208141826 U 11/2018
CN 111325312 A 6/2020
(Continued)

OTHER PUBLICATIONS

Office Action for Chinese Application No. 202110679295.X, dated Dec. 10, 2021, 7 pages.
(Continued)

*Primary Examiner* — Jennifer N Welch
*Assistant Examiner* — Amy P Hoang
(74) *Attorney, Agent, or Firm* — Lippes Mathias LLP

(57) ABSTRACT

A neural network processing method, a neural network processing unit (NPU) and a processing device are provided. The method includes: obtaining by a quantizing unit in the NPU float type input data, quantizing the float type input data to obtain quantized input data, and providing the quantized input data to an operation unit; performing by the operation unit of the NPU a matrix-vector operation and/or a convolution operation to the quantized input data to obtain an operation result of the quantized input data; and performing by the quantizing unit inverse quantization to the operation result output by the operation unit to obtain an inverse quantization result.

8 Claims, 3 Drawing Sheets

(51) Int. Cl.
*G06F 18/214* (2023.01)
*G06N 3/065* (2023.01)

(58) Field of Classification Search
CPC ..... G06N 3/08; G06F 9/30036; G06F 9/5016; G06F 18/2148; G06F 17/16; G06F 5/012; G06F 7/5443; G06F 9/3877; Y02D 10/00; G10L 15/28; G10L 15/16
See application file for complete search history.

(56) References Cited

U.S. PATENT DOCUMENTS

| | | | | |
|---|---|---|---|---|
| 2019/0294413 | A1* | 9/2019 | Vantrease | G06F 7/5443 |
| 2020/0242456 | A1* | 7/2020 | Kang | G06N 3/045 |
| 2020/0380360 | A1 | 12/2020 | Yu et al. | |
| 2021/0013276 | A1 | 1/2021 | Kim et al. | |
| 2021/0073614 | A1 | 3/2021 | Dikici et al. | |

FOREIGN PATENT DOCUMENTS

| | | | |
|---|---|---|---|
| CN | 111368972 | A | 7/2020 |
| CN | 111931917 | A | 11/2020 |
| CN | 111931918 | A | 11/2020 |
| CN | 112580787 | A | 3/2021 |
| CN | 112686365 | A | 4/2021 |
| KR | 20200009435 | A | 1/2020 |
| KR | 20210011461 | A | 2/2021 |
| WO | 2020249085 | A1 | 12/2020 |

OTHER PUBLICATIONS

Office Action for Chinese Application No. 202110679295.X, dated Mar. 15, 2022, 10 pages.
European Search Report for Application No. 22177114.0, dated Nov. 18, 2022, 10 pages.
Notice of Allowance for Korean Patent Application No. 10-2022-0063239, dated Dec. 21, 2024, 9 pages.
Notice of Allowance for Chinese Patent Application No. 202110679295X, dated Feb. 16, 2023, 6 pages.
Chen, "Mass production of embedded neural network processor chip"; China Electronic News; Jun. 24, 2016; Edition 007; 4 pages.
Hanif et al. "DNN-Life: An Energy-Efficient Aging Mitigation Framework for Improving the Lifetime of On-Chip Weight Memories in Deep Neural Network Hardware Architectures", arXiv:2101.12351v1 [cs.AR] Jan. 29, 2021; 6 pages.
KR OA 10-2022-0063239—Jul. 27, 2024—10 Pgs.
English Translation of KR OA 10-2022-0063239—Jul. 27, 2024—12 Pgs.
Office Action for Japanese Application No. 2022-089599, dated Aug. 8, 2023, 6 pages.

* cited by examiner

NEURAL NETWORK PROCESSING UNIT, NEURAL NETWORK PROCESSING METHOD AND DEVICE FOR QUANTIZATION

CROSS REFERENCE TO RELATED APPLICATIONS

This application is based on and claims priority to Chinese patent applications Serial No. 202110679295.X filed on Jun. 18, 2021, the entire contents of which are incorporated herein by reference.

TECHNICAL FIELD

The disclosure relates to technical fields of artificial intelligence (AI) such as deep learning and voice technology, and in particular to a neural network processing unit (NPU), a neural network processing method and a processing device.

BACKGROUND

Currently, for a voice chip of an electronic device such as a smart speaker, one core in a dual-core architecture is used for voice processing, and the other core is used to realize functions (such as business logics and control logics) of a main control microprogrammed control unit (MCU). However, processing all voices through a single core may lead to a huge processing burden.

SUMMARY

Embodiments of the disclosure provide an NPU, a neural network processing method and a processing device.

According to a first aspect of the disclosure, an NPU is provided. The NPU includes a quantizing unit and an operation unit. The quantizing unit is configured to obtain float type input data; quantize the float type input data to obtain quantized input data; provide the quantized input data to the operation unit to obtain an operation result; and perform inverse quantization to the operation result output by the operation unit to obtain an inverse quantization result. The operation unit is configured to perform a matrix-vector operation and/or a convolution operation to the quantized input data to obtain the operation result of the quantized input data.

According to a second aspect of the disclosure, a processing device is provided. The processing device includes: the NPU according to the first aspect, a pseudo static random access memory (PSRAM) and a digital signal processor (DSP) connected through a bus.

The DSP is configured to store input data to be processed in an internal memory, and store operation results obtained by the NPU based on the input data.

The PSRAM is configured to store network parameters of a neural network.

According to a third aspect of the disclosure, a neural network processing method is provided. The method is applied to an NPU including a quantizing unit and an operation unit. The method includes: obtaining by the quantizing unit float type input data, quantizing the float type input data to obtain quantized input data, and providing the quantized input data to the operation unit; performing by the operation unit a matrix-vector operation and/or a convolution operation to the quantized input data to obtain an operation result of the quantized input data; and performing by the quantizing unit inverse quantization to the operation result output by the operation unit to obtain an inverse quantization result.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

In order to save a cost of a voice chip and meet a requirement of a balance algorithm, an on-chip memory of the voice chip can be reduced, and then a system in package (SIP) is used to package a pseudo static random access memory (PSRAM) and expand the memory, so as to reduce the cost of the solution of externally hanging the PSRAM to the original voice chip through ESP32. That is, in the existing solution, the PSRAM is placed on a main control chip of the ESP32, and is externally placed on a board level, which requires extra costs. Therefore, the PSRAM can be packaged into the voice chip, to cooperate with reduction of the on-chip memory, and to save the cost of externally hanging the PSRAM.

However, with the reduction of the on-chip memory and the reduction of internal memory of high-bandwidth, a speed of data loading is decreased, which brings a risk of parallel loading of AI computing and model data. Therefore, how to improve a bandwidth utilization of the PSRAM is critical.

In addition, in order to save an area of the voice chip, the functions (such as, voice business logics, and control logics) of the main control MCU of the voice chip can be moved from the ESP32 to the voice chip. Only one core of the dual-core architecture of the voice chip is reserved for voice processing.

However, after using one core to process all the computing amounts of the dual core, a computing power of 8×8 and 16×8 multiplication and addition is insufficient, such that a pressure of using a single core to process all the voice is relatively large.

Therefore, with regard to the above-mentioned problems, the disclosure provides a neural network processing unit, a method neural network processing method, and a processing device.

A neural network processing unit, a neural network processing method, and a processing device according to the embodiments of the disclosure are described with reference to the accompanying drawings.

Figure 1:
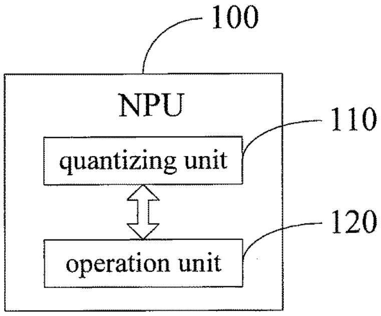
FIG. 1 is a block diagram of an NPU according to a first embodiment of the disclosure.

FIG. 1 is a schematic diagram of an NPU according to a first embodiment of the disclosure.

As illustrated in FIG. 1, the NPU 100 may include: a quantizing unit 110 and an operation unit 120.

The quantizing unit 110 is configured to obtain float type input data; quantize the float type input data to obtain quantized input data; provide the quantized input data to the operation unit 120 to obtain an operation result; and perform inverse quantization to the operation result output by the operation unit 120 to obtain an inverse quantization result.

The operation unit 120 is configured to perform a matrix-vector operation and/or a convolution operation to the quantized input data to obtain the operation result of the quantized input data.

In the embodiments of the disclosure, when the NPU is applied to the voice chip, the float type input data can be determined according to a feature vector of voice data input by the user. Correspondingly, the inverse quantization result is used to determine a voice recognition result corresponding to the voice data.

It should be understood that the NPU can also be applied to other chips. At this time, the float type input data can be determined according to other data, such as a feature vector of an image, a feature vector of a video frame and a feature vector of text, which is not limited in the disclosure.

In the embodiments, the quantizing unit 110 obtains the float type input data, quantizes the float type input data to obtain the quantized input data, and provides the quantized input data to the operation unit 120. Correspondingly, after the operation unit 120 receives the quantized input data, the operation unit 120 performs the matrix-vector operation and/or the convolution operation to the quantized input data to obtain the operation result of the input data, and outputs the operation result to the quantizing unit 110. After the quantizing unit 110 receives the operation result, the quantizing unit 110 performs the inverse quantization to the operation result to obtain the inverse quantization result. Therefore, a special hardware NPU is used to realize matrix calculation and/or convolution calculation. When the NPU is applied to the voice chip, a processing burden of a core of the voice chip can be reduced, and a processing efficiency of the core of the voice chip can be improved.

With the NPU of the embodiments of the disclosure, the quantizing unit obtains the float type input data, quantizes the float type input data to obtain the quantized input data, and provides the quantized input data to the operation unit. The operation unit performs the matrix-vector operation and/or the convolution operation to the quantized input data, to obtain the operation result of the input data. The quantizing unit performs the inverse quantization to the operation result output by the operation unit to obtain the inverse quantization result. Therefore, a special NPU is used to realize matrix calculation and/or convolution calculation. When the NPU is applied to a voice chip, a processing burden of a core of the voice chip can be reduced, and a processing efficiency of the core of the voice chip can be improved.

In order to clearly illustrate how the input data is quantized and how to perform the inverse quantization to the operation result output by the operation unit 120 in the above embodiments of the disclosure, the following disclosure takes the process of the operation unit 120 performing the matrix-vector operation as an example.

When the operation unit 120 performs the matrix-vector operation, the quantizing unit 110 can be used to obtain a first parameter for quantization and a second parameter for inverse quantization based on the float type input data stored in the internal memory of the DSP, obtain a multiplied value by multiplying a float value to be quantized in the float type input data by the first parameter, and round the multiplied value into a numerical value to obtain a numerical input data, and send the numerical input data to the operation unit 120, convert the operation result obtained by the operation unit 120 into a float type result, and send a value obtained by multiplying the float type result by the second parameter to the memory of the DSP for storage.

In the embodiment of the disclosure, the first parameter for quantization and the second parameter for inverse quantization are determined according to the float type input data.

For example, a maximum vector corresponding to the float type input data can be determined, the maximum vector is marked as fmax, the first parameter is B, and the second parameter is A, then B can be 127.0 f/fmax, and A can be fmax/127.0 f. A value range of a numerical value is −128-127. During quantization, fmax can be mapped to the quantized value 127, to obtain the maximum precision. Moreover, f refers to float (type).

In the embodiments of the disclosure, the quantizing unit 110 of the NPU 100 can obtain the first parameter for quantization and the second parameter for inverse quantization according to the float type input data stored in the internal memory of the DSP, obtain a multiplied value by multiplying a float value to be quantized (e.g., each float value in the input data) in the float type input data by the first parameter, round the multiplied value to obtain the numerical input data, and send the numerical input data to the operation unit 120. The operation unit 120 performs the matrix-vector operation on the numerical input data, to obtain the operation result of the input data. The operation unit 120 sends the operation result to the quantizing unit 110, and the quantizing unit 110 converts the operation result calculated by the operation unit 120 into the float type result, obtains the inverse quantization result by multiplying the float type result by the second parameter, and sends the inverse quantization result to the memory of the DSP for storage, so that subsequent operations can be performed by the software of the DSP.

On the one hand, the quantization process can be realized through a special quantizing unit, which can ensure that the NPU 100 can effectively perform the matrix calculation process. On the other hand, if the float type input data is stored in the memory of the DSP, and at the same time, the operation result of the matrix-vector operation is stored in the memory of the DSP, so that the DSP does not need to have a cache consistency design with the NPU, which can greatly simplify a hardware design and solve a data consistency problem of DSP and NPU.

Data consistency means that when the DSP accesses the random access memory (RAM) of the NPU (referred to as NPURAM), the accessed data can be mapped to the Cache. If the NPU modifies the data in the NPURAM, the DSP can only see the data in the cache but cannot see the modified data in the NPURAM, which causes a data consistency problem. When the NPU accesses the memory of the DSP, the memory of the DSP is visible to the DSP and the NPU at the same time, and there is no data consistency problem.

For example, the quantizing unit 110 in the NPU 100 can determine the maximum vector fmax corresponding to the float type input data, and determine the first parameter B for quantization and the second parameter A for inverse quantization according to the fmax. During performing the matrix-vector operation, all float values in the input data can be multiplied by B, then rounded and converted into the numerical values (char type). The char type input data is sent to the operation unit 120, and the operation unit 120 performs an 8×8 matrix-vector operation to the char type input data and a char type neural network parameter weight (the input vector of the matrix-vector operation needs to be quantized to 8 bit, and the matrix-vector operation is a matrix operation of 8 bit by 8 bit), the result of the matrix-vector operation is output to an accumulator ACC, and the result output by the ACC is considered as the operation result. The operation result output by the ACC can be converted into the float type result, and the float type result is multiplied by A to obtain a result and the result is sent to the memory of the DSP (such as a Dynamic Random Access Memory (DRAM)) for storage.

In a possible implementation of the embodiments of the disclosure, the network parameters of the neural network can be stored by the PSRAM, and the operation unit 120 can read at least part of the network parameters stored in the PSRAM, and perform the matrix-vector operation to the numerical input data according to the read network parameters, and synchronously continue to read the remaining network parameters in the PSRAM. Therefore, it is possible to perform the matrix-vector operation while reading the network parameters, that is, a parallel processing of the data reading/loading and the calculation can be realized, to improve the computing efficiency.

In an application scenario, for example, the neural network is applied to a voice recognition scenario, and above input data can be determined according to a feature vector of voice data input by the user, and the operation result output by the operation unit is used to determine the voice recognition result corresponding to the voice data.

In another application scenario, for example, the neural network is applied to an image recognition scenario or a video recognition scenario, the above input data can be determined according to a feature vector of image or a feature vector of a video frame. Correspondingly, the operation result output by the operation unit is used to determine an image classification result or a video frame classification result.

For example, the neural network is used for identity recognition, the above input data can be determined according to a feature vector of an image or a feature vector of a video frame. Correspondingly, the above operation result is used to determine identity information of a target object in the image or the video frame.

For example, the neural network is used for biopsy, the above input data can be determined according to a feature vector of an image or a feature vector of a video frame. Correspondingly, the operation result is used to determine whether there is a living body in the image or video frame. For example, when a probability output by the neural network is greater than or equal to a preset threshold (for example, the preset threshold may be 0.5), the classification result is that there is a living body, and when the probability output by the neural network is less than the preset threshold, the classification result is that there is no living body.

For example, the neural network is used to detect a prohibited image (such as a violent image and a pornographic image), the above input data can be determined according to a feature vector of an image or a feature vector of a video frame. Correspondingly, the above operation result is used to determine whether the image or the video frame is a prohibited image. For example, when the probability output by the neural network is greater than or equal to a preset threshold, the classification result is that the image or video frame is a prohibited image, and when the probability output by the neural network is less than the preset threshold, the classification result is that the image or video frame is a normal image.

In another application scenario, for example, the neural network is applied to a voice translation scenario, the above input data can be determined according to a feature vector of voice data input by the user. Correspondingly, the operation result output by the operation unit is used to determine a voice translation result.

For example, the neural network is applied to a Chinese-English translation scenario, the above input data can be determined according to a feature vector of Chinese voice data. Correspondingly, the above operation result is used to determine an English translation result corresponding to the Chinese voice data, and this English translation result can be in a voice form or a text form, which is not limited in the disclosure.

In a possible implementation of the embodiments of the disclosure, the NPU 100 can access the internal memory of the DSP through the bus. In detail, NPU 100 can also include a main interface of the bus. The main interface is configured to send a memory copy function memcpy to the DSP through the bus to access the internal memory of the DSP, in order to obtain the float type input data stored in the internal memory of the DSP. In this way, the input data stored in the internal memory of the DSP can be effectively read, so that the NPU 100 can effectively perform the calculation process. In addition, the internal memory of the DSP is visible to the DSP and the NPU at the same time, and the data consistency problem can be avoided by accessing the internal memory of the DSP through the bus.

In a possible implementation of the embodiments of the disclosure, when the operation unit 120 performs the convolution operation, the quantizing unit 110 is further configured to: convert the float type input data into a short type input data, and the operation unit 120 performs the convolution operation to the converted short type input data. Thus, the quantization process can be simplified into a process of converting the float type input data into the short type input data, which can not only ensure an accuracy of the convolution process, but also can reduce a computing overhead of the quantization process.

The float type input data can be stored in the internal memory of the DSP.

In a possible implementation of the embodiments of the disclosure, the NPU 100 can be connected to the RAM through a high-speed access interface, and the RAM can obtain the short type input data from the NPU, and transfer the short type input data into the RAM, so that in the subsequent calculation process, the operation unit 120 can effectively acquire the short type input data from the RAM, and perform the convolution operation to the short type input data. That is, in the disclosure, the short type input data output by the quantizing unit 110 may be stored by the RAM.

The above RAM is the RAM of the NPU, referred to as NPURAM for short.

In order to clearly illustrate how the convolution operation is performed on the short type input data in the above embodiments of the disclosure, the disclosure provides another NPU.

Figure 2:
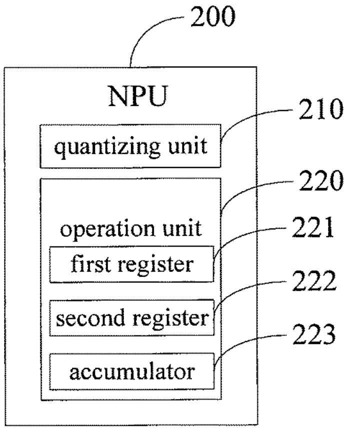
FIG. 2 is a block diagram of an NPU according to a second embodiment of the disclosure.

FIG. 2 is a schematic diagram of an NPU 200 according to a second embodiment of the disclosure.

As illustrated in FIG. 2, the NPU 200 may include: a quantizing unit 210 and an operation unit 220. The operation unit 220 includes a first register 221, a second register 222 and an accumulator 223.

The quantizing unit 210 is configured to: convert the float type input data into short type input data, and perform the convolution operation to the converted short type input data.

The NPU 200 is connected to the RAM through the high-speed access interface. The RAM is configured to transfer the short type input data to the RAM.

The first register 221 is configured to read the short type input data from the RAM within a first cycle.

The second register 222 is configured to read at least part of network parameters stored in a PSRAM within a plurality of cycles after the first cycle, and perform a dot product operation to the at least part of the network parameters read within each cycle and the corresponding input data in the first register 221.

The accumulator 223 is configured to obtain a dot product result and perform accumulation according to the dot product result to obtain the operation result of the convolution operation.

For example, the network parameter is marked as weight', the network parameter weight' can be divided into 8 network parameters weight", each weight" is read through the bus. The convolution operation is only for the short type input data and weight". When a certain network parameter weight" is obtained within a certain cycle, during performing the convolution operation based on the network parameter weight" and the short type input data, the operation unit can read a next network parameter weight", so that the reading/loading process and the convolution calculation process can be performed in parallel, thus improving an efficiency of the convolution calculation.

Figure 3:
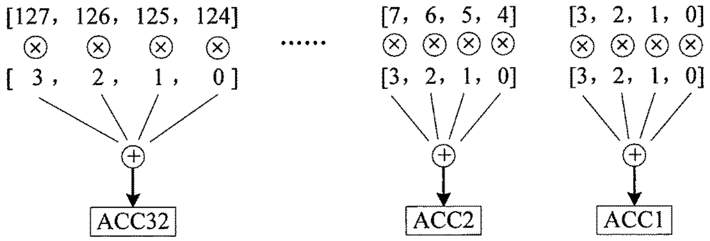
FIG. 3 is the schematic diagram of a convolution calculation process according to an embodiment of the disclosure.

For example, the input data is marked as I, the network parameter of the neural network is W, and the input data is 128 bytes, the first 4 bytes [0,3] in the input data can be read within the first cycle, the network parameters of 32 cycles are read from the second cycle to the 33rd cycle, that is, 128 bytes of network parameters. As illustrated in FIG. 3, the dot product operation is performed on the first 4 bytes of the input data and the 128 bytes of the network parameters simultaneously, and the ACC accumulates dot product operation results for the 32 cycles in total.

For example, the output of ACC1 in FIG. 3 is: $W[3]\times I[3]+W[2]\times I[2]+W[1]\times I[1]+W[0]\times I[0]$. Similarly, the output of ACC2 is: $W[7]\times I[3]+W[6]\times I[2]+W[5]\times I[1]+W[4]\times I[0]$, and so on, the output of ACC3 is: $W[127]\times I[3]+W[126]\times I[2]+W[125]\times I[1]+W[124]\times I[0]$.

Afterwards, 4 bytes [4,7] in the input data and the network parameters of 32 cycles are read again, the dot product operation is performed, and the dot product operation results are sent to the accumulator for accumulation until all bytes in the input data are consumed, that is, until all bytes in the input data participate in the operation, the matrix operation ends.

Thus, in the process of loading or reading the network parameters, the convolution operation is performed using the network parameters that have been read, so that a parallel execution of the data reading/loading and the convolution calculation can be realized, thus improving an efficiency of the convolution calculation.

In a possible implementation of the embodiments of the disclosure, when the NPU is applied to the voice chip, in order to further reduce the processing burden of the core in the voice chip, the NPU may also include a high-performance activating unit, the operation result of the convolution operation is activated by the activating unit. In detail, the operation result of the convolution operation can be sent to the memory of the DSP for storage, the activating unit can access the internal memory of the DSP through the bus, obtain the operation result of the convolution operation stored in the DSP, perform activation by using the activation function according to the operation result of the convolution operation, and provide the activation result to the DSP for storage, so that subsequent operations can be performed by the software of the DSP.

The above embodiment is a structure of an NPU, and the disclosure also provides a structure of a processing device.

Figure 4:
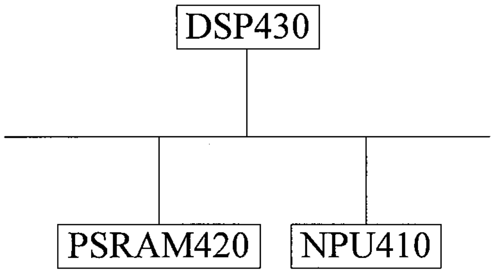
FIG. 4 is a schematic diagram of a processing device according to a third embodiment of the disclosure.

FIG. 4 is a schematic diagram of a processing device according to a third embodiment of the disclosure.

As illustrated in FIG. 4, the processing device may include: the NPU 410 provided in any of the above embodiments, a PSRAM 420 and a DSP 430 connected through a bus.

The DSP 430 is configured to store input data to be processed in an internal memory, and store operation results performed by the NPU based on the input data.

The PSRAM 420 is configured to store network parameters of a neural network.

In the embodiments of the disclosure, the NPU 410 can access the internal memory of the DSP 430 through the bus, to read the input data to be processed, and access the PSRAM420 through the bus to obtain at least part of the network parameters. At least one of a matrix-vector operation and a convolution operation is performed to the input data according to the at least part of network parameters, further the remaining network parameters in the PSRAM420 are read synchronously, and at least one of the matrix-vector operation and the convolution operation can be performed to the input data according to the remaining network parameters, so as to obtain an operation result of the input data. Therefore, it is possible to perform the calculation process while reading or loading data, that is, a parallel execution of the data reading/loading and the calculation can be achieved, thereby improving the calculation efficiency.

It should be noted that, in the related art, the data of the PSRAM needs to be loaded by the Cache, and the DSP is in a standby state when the Cache is loaded. After the data loading is completed, the loaded data can be used to perform the calculation process, such that the calculation efficiency is low.

In the disclosure, the loading process of the network parameters in the PSRAM 420 and the calculation process of the NPU 410 are performed in parallel, which can not only improve the utilization rate of data loading, but also greatly improve the calculation efficiency. For example, the neural network is applied to a voice recognition scene, under the circumstance that the calculation efficiency is greatly improved, the processing device can be made more suitable for the neural network-based voice wake-up and recognition tasks.

Figure 5:
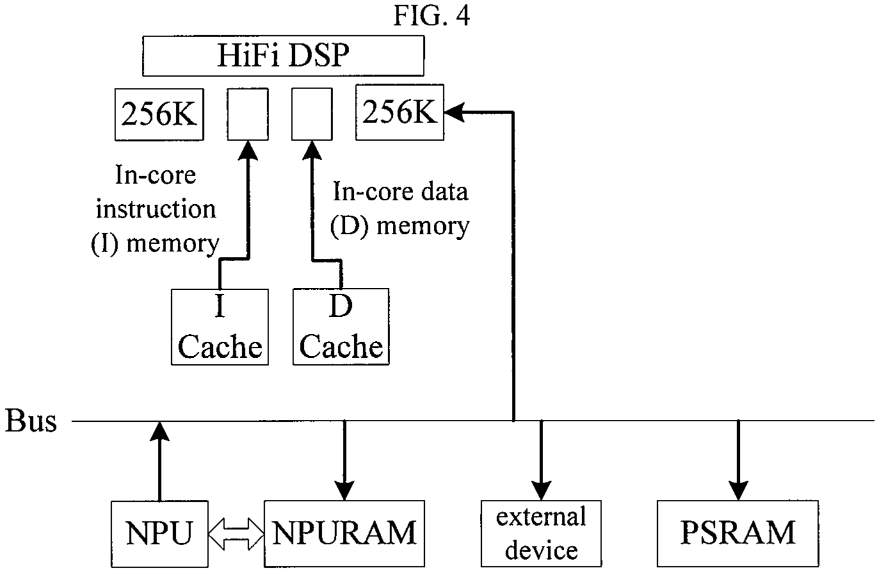
FIG. 5 is a schematic diagram of a processing device according to a fourth embodiment of the disclosure.

For example, the DSP is a high fidelity (HiFi) DSP, the structure of the processing device is shown in FIG. 5. The NPU can include a main interface of the bus, and the main interface can access the memory inside the HiFi DSP through the bus. In addition, the NPU also has a high-speed access interface (128 byte/cycle), through which the NPU is connected to the NPURAM.

By storing the float type input data, operation results of the matrix-vector operation and the convolution operation (in a float format) in the memory of the HiFi DSP, the HiFi DSP does not need to have a Cache consistency design with the NPU, that is, the hardware design can be simplified, without modifying the Cache structure or adding a coherent bus.

In terms of computing power, the NPU has built-in 128 8×8 multiplication and addition operations, and supports three matrix operation modes including 4×32, 8×16, and 16×8, it is compatible with 64 16×8 multiplication and addition operations at the same time, and supports three convolution operation modes including 2×32, 4×16, and 8×8. 4×32 means that 128 elements are classified into 32 groups, the dot product operation is performed to 4 elements of each group and 4 elements of the input data, and the dot product results are sent to 32 accumulators. If a vector dimension of the input data is N, a total of N/4 cycles are required to complete the 1×N and N×32 matrix operations. The situation is similar to 8×16, 16×8.

Matrix operation is also called as matrix-vector operation. The input data or input vector is quantized into 8bit, vector-matrix multiplication operation of 8bit by 8bit is performed, the matrix operation result is multiplied by the quantized scale value (the second parameter) of the input data. The network parameter weight of the neural network also needs to be quantized. The quantization process of the network parameter can be completed by the software of the HiFi DSP, that is, the operation of a scaling coefficient and a bias coefficient (Scale value and Bias value) of the weight can be completed by the software of the HiFi DSP, the calculation amount of this part is relatively low. In terms of the above operations, in the process of 8×8 matrix operation with 64×64 elements, the computing power of quantization accounts for about 30%, the computing power of 8×8 matrix operation accounts for about 67%, and the computing power of multiplication of the scale value accounts for 3%. The quantization process accounts for a high proportion, and the main reason is that in the process of converting the float type data to the short type fixed-point data, it is necessary to determine a sign bit of the float type data, and perform a calculation on the float type data with ±0.5, and then convert the obtained data to an integer of int8. HiFi DSP does not have specific acceleration instructions for this operation, so this operation only can be executed one by one. Through the above hardware acceleration method of the disclosure, a dedicated circuit can be adopted, that is, the proportion of this part can be reduced from 30% to 5% by performing the matrix operation through the NPU. By combining with the matrix operation, 8 multiplication and addition operations per cycle are increased to 128 multiplication and addition operations, which greatly improves the computing efficiency.

For the convolution operation, the input data has 16 bits, which simplifies the quantization process to a process of converting float*1024 (i.e., the float type input data is multiplied by 1024) to a short type fixed-point. The original quantization process is to find a maximum value absmax of the input data or input vector, all values are divided by max and multiplied by 127. This calculation requires three steps, and the conversion of the float*1024 to the short type fixed-point is only the third step. As a result, an accuracy of the convolution process is guaranteed, and the computing overhead of the quantization process is reduced (the original quantization process cannot be realized through a parallel calculation).

The NPU has a high-performance activating unit, which implements operations such as sigmoid/tan h/log/exp, with the precision close to that of a single-precision float-point. The calculation of one unit can be completed in one cycle, which greatly reduces the time of using the HiFi DSP to calculate these functions, the calculation of each unit takes about 400-1000 cycles.

The usage of the dedicated quantizing unit reduces the time overhead of quantization, and the disclosure can also improve the computing efficiency by extreme usage of memory.

On the premise of not losing performance, a size of a static random access memory (SRAM) inside a chip can be reduced as much as possible. Compared with the voice chip in the related art, the storage of 1MB+ may be placed on the PSRAM. For the PSRAM, the bandwidth is only 166MB/s. If it is called once every 10 ms, only reading this 1MB needs to occupy 60% of the bandwidth. When the computing efficiency is 80%, this proportion will increase to 75%. Therefore, firstly, it is necessary to put a model with a small number of callings into the PSRAM, for example, the model placed in the PSRAM has a model that is called once every 30 ms. In addition, when the data is loaded, the calculation needs to be performed at the same time, and the layer-level buffering of the model is performed inside the chip to reduce repeated loading. When using the NPU hardware for acceleration, the loading of network parameters, the storing of data in the on-chip RAM, and the calculation process can be completely parallelized, which removes the limitation of performing calculations after waiting for the loading, thereby maximizing bandwidth utilization, which is impossible for the HiFi DSP system. Therefore, in the disclosure, the parallelization of the loading and the calculation is realized by using hardware, and the NPU not only loads the network parameters in the PSRAM, but also performs the matrix operation at the same time.

The hardware acceleration may realize reading of 128 Bytes from the on-chip RAM per cycle, and its bandwidth is 16 times greater than 64 bits of the HiFi DSP. The input process described above includes the quantization process, or the process of converting float type data to short type data. Based on the consideration of an area of the NPU hardware acceleration unit, it is impossible to place 128 hardware units of these two processes, so the reading rate of 128 Bytes is needless. Finally, it is determined that the reading bandwidth of the bus is 64 bit, and 2 executing units are placed. Therefore, for the float type input data or input vector, its storage location needs to be placed in the core of the HiFi DSP (i.e., internal memory). At the same time, the results of the matrix operation and the convolution operation (in the float format) also need to be stored back into the core of the HiFi DSP. In this way, the HiFi DSP does not need to have a Cache consistency design with the NPU, which greatly simplifies the design. After using the structure of the processing device, the calculation-intensive part is calculated by the NPU, and the HiFi DSP is used for general-purpose calculation and voice signal processing calculation, so as to achieve the optimal calculation efficiency of various voice tasks, as well as the parallel execution of calculation and loading.

With the processing device of the embodiments of the disclosure, by adopting a special NPU, matrix calculation and/or convolution calculation can be realized, when this NPU is applied in the voice chip, the processing burden of the core in the voice chip is reduced, the processing efficiency of the core in the voice chip is improved.

In order to realize the above embodiments, the disclosure also provides a neural network processing method.

Figure 6:
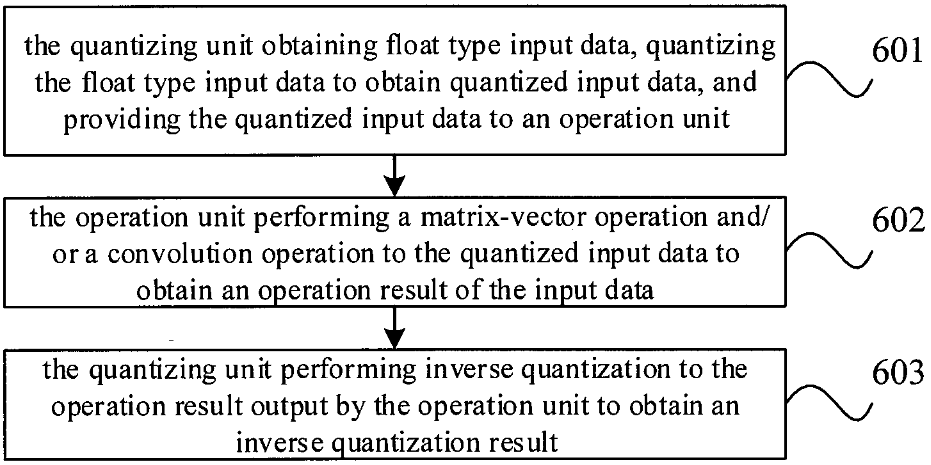
FIG. 6 is a flowchart of a neural network processing method according to a fifth embodiment of the disclosure.

FIG. 6 is a flowchart of a neural network processing method according to a fifth embodiment of the disclosure.

The embodiment of the disclosure provides a neural network processing method, applied to a neural network processing unit (NPU) including a quantizing unit and an operation unit.

As illustrated in FIG. 6, the neural network processing method includes the following steps.

At block 601, the quantizing unit obtains float type input data, quantizes the float type input data to obtain quantized input data, and provides the quantized input data to the operation unit.

At block 602, the operation unit performs a matrix-vector operation and/or a convolution operation to the quantized input data to obtain an operation result of the quantized input data.

At block 603, the quantizing unit performs inverse quantization to the operation result output by the operation unit to obtain an inverse quantization result.

In a possible implementation of the embodiments of the disclosure, when the operation unit performs the matrix-vector operation, the quantizing unit obtains a first parameter for quantization and a second parameter for inverse quantization according to the float type input data stored in an internal memory of the DSP, obtains a multiplied value by multiplying a float value to be quantized in the float type input data by the first parameter, rounds the multiplied value into a numerical value to obtain a numerical input data, and sends the numerical input data to the operation unit. The operation unit performs the matrix-vector operation to the numerical input data to obtain the operation result. The quantizing unit converts the operation result into a float type result, and send a value obtained by multiplying the float type result by the second parameter to the memory of the DSP for storage.

In a possible implementation of the embodiments of the disclosure, the NPU further includes a main interface of a bus, the main interface is configured to send a memory copy function to the DSP through the bus, in order to access the internal memory of the DSP and obtain the float type input data stored in the internal memory of the DSP.

In a possible implementation of the embodiments of the disclosure, when the operation unit performs the convolution operation, the quantizing unit converts the float type input data into a short type input data, and the operation unit performs the convolution operation to the converted short type input data to obtain the operation result.

In a possible implementation of the embodiments of the disclosure, the NPU is connected to a RAM through a high-speed access interface, and the RAM is configured to transfer the short type input data to the RAM.

In a possible implementation of the embodiments of the disclosure, the operation unit includes a first register, a second register and an accumulator. The first register reads the short type input data from the RAM within a first cycle. The second register reads at least part of network parameters stored in a PSRAM within a plurality of cycles after the first cycle, and performs a dot product operation to the at least part of the network parameters read within each cycle and the corresponding input data in the first register. The accumulator obtains a dot product result and perform accumulation according to the dot product result to obtain the operation result of the convolution operation.

In a possible implementation of the embodiments of the disclosure, the NPU further includes an activating unit, and the activating unit obtains an activation result by performing activation using an activation function according to the operation result of the convolution operation stored in the DSP, and provide the activation result to the DSP for storage.

It should be noted that the explanation of the NPU and the explanation of the processing device in any of the foregoing embodiments are also applicable to this embodiment, and the implementation principles thereof are similar, which are not repeated here.

According to the method of the embodiments of the disclosure, the quantizing unit obtains the float type input data, quantizes the float type input data to obtain the quantized input data, and provides the quantized input data to the operation unit to obtain the operation result. The operation unit performs the matrix-vector operation and/or the convolution operation to the quantized input data to obtain the operation result of the input data. The quantizing unit performs the inverse quantization to the operation result output by the operation unit to obtain an inverse quantization result. Therefore, a special NPU is used to realize matrix calculation and/or convolution calculation, when the NPU is applied to a voice chip, the processing burden of a core of the voice chip can be reduced, and the processing efficiency of the core of the voice chip can be improved.

In order to implement the above embodiments, an electronic device is provided. The electronic device includes: at least one processor and a memory communicatively coupled to the at least one processor. The memory stores instructions executable by the at least one processor, and when the instructions are executed by the at least one processor, the at least one processor is caused to perform the neural network processing method according to any of embodiments of the disclosure.

In order to implement the above embodiments, a non-transitory computer-readable storage medium having computer instructions stored thereon is provided. The computer instructions are configured to cause a computer to implement the neural network processing method according to any embodiment of the disclosure.

In order to implement the above embodiments, a computer program product including computer programs is provided. When the computer programs are executed by a processor, the neural network processing method according to any embodiment of the disclosure is implemented.

According to the embodiments of the disclosure, the disclosure also provides an electronic device, a readable storage medium and a computer program product.

Figure 7:
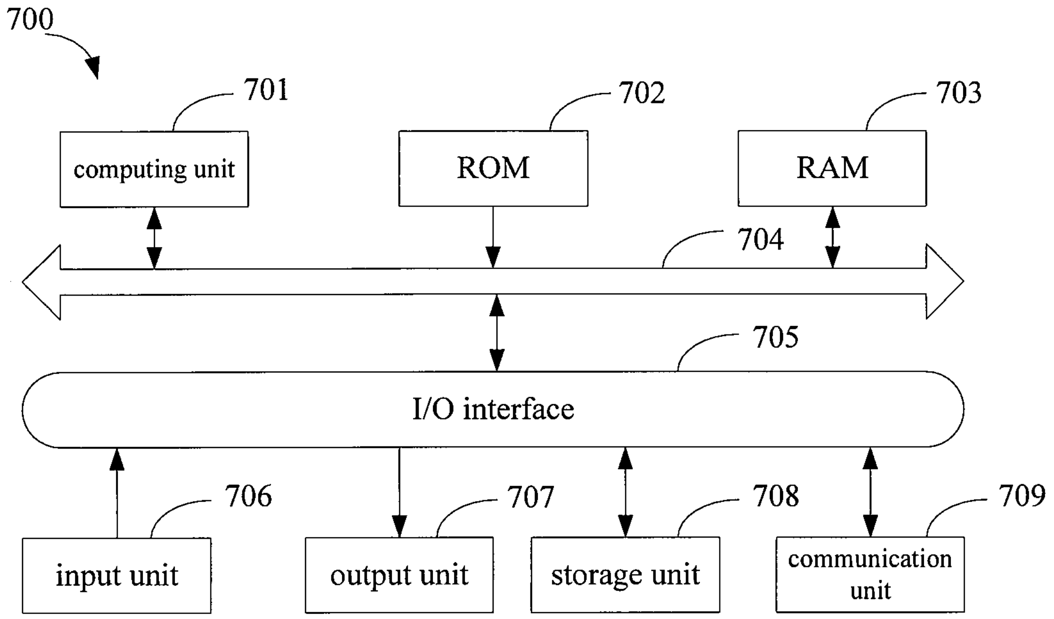
FIG. 7 is a block diagram of an electronic device capable of implementing the embodiments of the disclosure.

FIG. 7 is a block diagram of an electronic device used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the device 700 includes a computing unit 701 performing various appropriate actions and processes based on computer programs stored in a read-only memory (ROM) 702 or computer programs loaded from the storage unit 708 to a random access memory (RAM) 703. In the RAM 703, various programs and data required for the operation of the device 700 are stored. The computing unit 701, the ROM 702, and the RAM 703 are connected to each other through a bus 704. An input/output (I/O) interface 705 is also connected to the bus 704.

Components in the device 700 are connected to the I/O interface 705, including: an inputting unit 706, such as a keyboard, a mouse; an outputting unit 707, such as various types of displays, speakers; the storage unit 708, such as a disk, an optical disk; and a communication unit 709, such as network cards, modems, and wireless communication transceivers. The communication unit 709 allows the device 700 to exchange information/data with other devices through a computer network such as the Internet and/or various telecommunication networks.

The computing unit 701 may be various general-purpose and/or dedicated processing components with processing and computing capabilities. Some examples of computing unit 701 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 701 executes the various methods and processes described above, such as the method for processing a neural network. For example, in some embodiments, the method may be implemented as a computer software program, which is tangibly contained in a machine-readable medium, such as the storage unit 708. In some embodiments, part or all of the computer program may be loaded and/or installed on the device 700 via the ROM 702 and/or the communication unit 709. When the computer program is loaded on the RAM 703 and executed by the computing unit 701, one or more steps of the method described above may be executed. Alternatively, in other embodiments, the computing unit 701 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and Block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve the problems of difficult management and weak service scalability existing in traditional physical hosts and virtual private server (VPS) services. The server can also be a server of a distributed system, or a server combined with a block-chain.

It should be noted that AI is the study of making computers to simulate certain thinking processes and intelligent behaviors of humans (such as learning, reasoning, thinking and planning), which has both hardware-level technologies and software-level technologies. AI hardware technologies generally include technologies such as sensors, dedicated AI chips, cloud computing, distributed storage, and big data processing. AI software technologies mainly include computer vision, speech recognition technology, natural language processing technology, machine learning/deep learning, big data processing technology, knowledge graph technology and other major directions.

According to the technical solution of the embodiments of the disclosure, the quantizing unit obtains the float type input data, quantizes the float type input data to obtain the quantized input data, and provides the quantized input data to the operation unit. The operation unit performs the matrix-vector operation and/or the convolution operation to the quantized input data to obtain the operation result of the input data. The quantizing unit performs the inverse quantization to the operation result output by the operation unit to obtain an inverse quantization result. Therefore, a special NPU is used to realize matrix calculation and/or convolution calculation, when the NPU is applied to a voice chip, the processing burden of a core of the voice chip can be reduced, and the processing efficiency of the core of the voice chip can be improved.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A neural network processing unit (NPU) for quantization, comprising: a quantizing unit and an operation unit; wherein, the quantizing unit is configured to obtain float type input data; quantize the float type input data to obtain quantized input data; provide the quantized input data to the operation unit to obtain an operation result; and perform inverse quantization to the operation result output by the operation unit to obtain an inverse quantization result; and the operation unit is configured to perform at least one of a matrix-vector operation and a convolution operation to the quantized input data to obtain the operation result of the quantized input data;

wherein when the operation unit is configured to perform the convolution operation, the quantizing unit is configured to convert the float type input data into a short type input data; and the operation unit is configured to perform the convolution operation to the short type input data;

wherein the NPU is connected to a random access memory (RAM) through a high-speed access interface, and the RAM is configured to transfer the short type input data to the RAM;

wherein the operation unit comprises a first register, a second register and an accumulator;

the first register is configured to read the short type input data from the RAM within a first cycle;

the second register is configured to, within a plurality of cycles after the first cycle: read at least part of network parameters stored in a pseudo static random access memory (PSRAM), perform a dot product operation to the at least part of the network parameters read within each cycle and the corresponding input data in the first register, and, during the dot product operation of a current cycle of the plurality of cycles, synchronously read at least part of network parameters required for a next cycle; and the accumulator is configured to obtain a dot product result and perform accumulation according to the dot product result so as to obtain the operation result of the convolution operation, and to send the operation result of the convolution operation to a memory of a DSP for storage;

wherein the NPU further comprises: an activating unit, configured to obtain an activation result by performing activation using an activation function according to the operation result of the convolution operation stored in the DSP, and provide the activation result to the DSP for storage.

2. The NPU of claim 1, wherein when the operation unit is further configured to perform the matrix-vector operation, the quantizing unit is configured to:

obtain a first parameter for quantization and a second parameter for inverse quantization, based on the float type input data stored in a memory of a digital signal processor (DSP);

obtain a multiplied value by multiplying a float value to be quantized in the float type input data by the first parameter, and round the multiplied value into a numerical value to obtain numerical input data;

send the numerical input data to the operation unit;

convert the operation result obtained by the operation unit into a float type result; and send the inverse quantization result obtained by multiplying the float type result by the second parameter to the memory of the DSP for storage.

3. The NPU of claim 2, wherein the NPU further comprises a main interface of a bus, the main interface is configured to send a memory copy function to the DSP through the bus, so as to access the memory of the DSP and obtain the float type input data stored in the memory of the DSP.

4. A processing device, comprising: an NPU for quantization, a PSRAM and a DSP connected through a bus;

wherein the DSP is configured to store float type input data to be processed in an internal memory, and store operation results obtained by the NPU based on the input data;

the PSRAM is configured to store network parameters of a neural network; and the NPU comprises a quantizing unit and an operation unit; wherein, the quantizing unit is configured to obtain float type input data; quantize the float type input data to obtain quantized input data; provide the quantized input data to the operation unit to obtain an operation result; and perform inverse quantization to the operation result output by the operation unit to obtain an inverse quantization result; and the operation unit is configured to perform at least one of a matrix-vector operation and a convolution operation to the quantized input data to obtain the operation result of the quantized input data;

wherein when the operation unit is configured to perform the convolution operation, the quantizing unit is configured to convert the float type input data into a short type input data; and the operation unit is configured to perform the convolution operation to the short type input data;

wherein the NPU is connected to a random access memory (RAM) through a high-speed access interface, and the RAM is configured to transfer the short type input data to the RAM;

wherein the operation unit comprises a first register, a second register and an accumulator;

the first register is configured to read the short type input data from the RAM within a first cycle;

the second register is configured to, within a plurality of cycles after the first cycle: read at least part of network parameters stored in a pseudo static random access memory (PSRAM), perform a dot product operation to the at least part of the network parameters read within each cycle and the corresponding input data in the first register, and, during the dot product operation of a current cycle of the plurality of cycles, synchronously read at least part of network parameters required for a next cycle; and the accumulator is configured to obtain a dot product result and perform accumulation according to the dot product result so as to obtain the operation result of the convolution operation, and to send the operation result of the convolution operation to a memory of a DSP for storage;

wherein the NPU further comprises: an activating unit, configured to obtain an activation result by performing activation using an activation function according to the operation result of the convolution operation stored in the DSP, and provide the activation result to the DSP for storage.

5. The processing device of claim 4, wherein when the operation unit is further configured to perform the matrix-vector operation, the quantizing unit is configured to:

obtain a first parameter for quantization and a second parameter for inverse quantization, based on the float type input data stored in the internal memory of the DSP;

obtain a multiplied value by multiplying a float value to be quantized in the float type input data by the first parameter, and round the multiplied value into a numerical value to obtain numerical input data;

send the numerical input data to the operation unit;

convert the operation result obtained by the operation unit into a float type result; and send the inverse quantization result obtained by multiplying the float type result by the second parameter to the memory of the DSP for storage.

6. A neural network processing method for quantization, applied to an NPU for quantization comprising a quantizing unit and an operation unit, the method comprising:

obtaining by the quantizing unit float type input data, quantizing the float type input data to obtain quantized input data, and providing the quantized input data to the operation unit;

performing by the operation unit at least one of a matrix-vector operation and a convolution operation to the quantized input data to obtain an operation result of the quantized input data; and performing by the quantizing unit inverse quantization to the operation result output by the operation unit to obtain an inverse quantization result;

wherein the method further comprises:

converting by the quantizing unit the float type input data into a short type input data, and said performing by the operation unit at least one of a matrix-vector operation and a convolution operation to the quantized input data comprising:

performing by the operation unit the convolution operation to the short type input data to obtain the operation result;

wherein the NPU is connected to a random access memory (RAM) through a high-speed access interface, and the method further comprises:

transferring by the RAM the short type input data to the RAM;

wherein the operation unit comprises a first register, a second register and an accumulator;

said performing by the operation unit the convolution operation to the short type input data comprising:

reading by the first register the short type input data from the RAM within a first cycle;

within a plurality of cycles after the first cycle, reading, by the second register, at least part of network parameters stored in a pseudo static random access memory (PSRAM), performing, by the second register, a dot product operation to the at least part of the network parameters read within each cycle and the corresponding input data in the first register, and, during the dot product operation of a current cycle of the plurality of cycles, synchronously reading, by the second register, at least part of network parameters required for a next cycle; and obtaining by the accumulator a dot product result, performing accumulation according to the dot product result to obtain the operation result of the convolution operation, and sending the operation result of the convolution operation to a memory of a DSP for storage;

wherein the NPU further comprises an activating unit, and the method further comprises: obtaining by the activating unit an activation result by performing activation using an activation function according to the operation result of the convolution operation stored in the DSP, and providing the activation result to the DSP for storage.

7. The method of claim 6, said quantizing the float type input data to obtain quantized input data and providing the quantized input data to the operation unit comprising:

obtaining by the quantizing unit a first parameter for quantization and a second parameter for inverse quantization, based on the float type input data stored in a memory of a digital signal processor (DSP); obtaining a multiplied value by multiplying a float value to be quantized in the float type input data by the first parameter, and rounding the multiplied value into a numerical value to obtain a numerical input data; and sending the numerical input data to the operation unit;

said performing by the operation unit at least one of a matrix-vector operation and a convolution operation to the quantized input data comprising:

performing by the operation unit the matrix-vector operation to the numerical input data to obtain the operation result;

said performing by the quantizing unit inverse quantization to the operation result output by the operation unit comprising:

converting by the quantizing unit the operation result into a float type result, and sending the inverse quantization result obtained by multiplying the float type result by the second parameter to the memory of the DSP for storage.

8. The method of claim 7, wherein the NPU further comprises a main interface of a bus, and the method further comprises:

sending by the main interface a memory copy function to the DSP through the bus, so as to access the memory of the DSP and obtain the float type input data stored in the memory of the DSP.

* * * * *